United States Patent
Chen et al.

(10) Patent No.: US 10,510,454 B2
(45) Date of Patent: Dec. 17, 2019

(54) MAIN PUMP SHAFT SEAL WATER INJECTION SYSTEM OF A NUCLEAR POWER STATION

(71) Applicants: China Nuclear Power Engineering Co., Ltd., Shenzhen, Guangdong (CN); Shenyang Blower Group Nuclear Power Pumps Co., Ltd., Shenyang, Liaoning (CN); China General Nuclear Power Group, Shenzhen, Guangdong (CN)

(72) Inventors: Xingjiang Chen, Guangdong (CN); Zhiyuan Luo, Guangdong (CN); Yuangang Duan, Guangdong (CN); Zhongshuang Li, Guangdong (CN); Wei Fu, Guangdong (CN); Guohui Cong, Guangdong (CN); Zhao Chen, Guangdong (CN); Xiaowu Song, Guangdong (CN); Yanzhang Liu, Liaoning (CN); Xueling Wang, Liaoning (CN); Jiajiong Ma, Liaoning (CN); Yixun Zhang, Liaoning (CN)

(73) Assignees: China Nuclear Power Engineering Co., Ltd., Shenzhen (CN); Shenyang Blower Group Nuclear Power Pumps Co., Ltd., Shenyang (CN); China General Nuclear Power Group, Shenzhen (CN)

( * ) Notice: Subject to any disclaimer, the term of this patent is extended or adjusted under 35 U.S.C. 154(b) by 614 days.

(21) Appl. No.: 15/373,495

(22) Filed: Dec. 9, 2016

(65) Prior Publication Data
US 2018/0005716 A1    Jan. 4, 2018

(30) Foreign Application Priority Data
Dec. 11, 2015 (CN) .......................... 2015 1 0918937

(51) Int. Cl.
*G21D 1/04* (2006.01)
*G21D 1/02* (2006.01)
(Continued)

(52) U.S. Cl.
CPC .................. *G21D 1/04* (2013.01); *G21D 1/02* (2013.01); *F04D 29/10* (2013.01); *F16J 15/16* (2013.01); *F16J 15/34* (2013.01)

(58) Field of Classification Search
CPC . G21D 1/02; G21D 1/04; G21C 15/24; G21C 15/243; F04D 29/106; F04D 29/10; F04D 29/588
See application file for complete search history.

(56) References Cited

U.S. PATENT DOCUMENTS 4,048,012 A * 9/1977 George .................... F01K 7/22
                                                 376/298

* cited by examiner

*Primary Examiner* — Ninh H. Nguyen
*Assistant Examiner* — Maxime M Adjagbe

(57) ABSTRACT

A main pump shaft seal water injection system of a nuclear power plant includes a jet pump, a high pressure cooler, a hydrocyclone, valves and a main connection pipeline outside of a main pump, and an auxiliary pump and an internal flow path inside the main pump. Inner and outer flow paths of the main pump are connected with a shaft seal water injection hole and a high temperature water drainage hole. The main connection pipeline is connected between an upper filling water pipeline and a shaft seal water injection hole. A bypass pipeline connected with the jet pump, the high pressure cooler and the hydrocyclone, the main connection pipeline is provided with a normally open main pipeline isolating valve. The bypass pipeline allows low temperature upper filling water in the RCV system to enter the shaft seal water injection hole of the main flange directly.

10 Claims, 7 Drawing Sheets

(51) Int. Cl.
*F04D 29/10* (2006.01)
*F16J 15/16* (2006.01)
*F16J 15/34* (2006.01)

MAIN PUMP SHAFT SEAL WATER INJECTION SYSTEM OF A NUCLEAR POWER STATION

CROSS-REFERENCE TO PRIOR APPLICATION

The present application claims the benefit of Chinese Patent Application No. 201510918937.1 filed on Dec. 11, 2015, the contents of which are incorporated herein by reference.

TECHNICAL FIELD

The present invention generally relates to nuclear power stations and, more particularly, relates to a main pump shaft seal water injection system of a nuclear power plant.

BACKGROUND

Reactor coolant pump is referred as "main pump", which is one of the key equipment of a pressurized water reactor nuclear power plant, only the reliable operation of the main pump can ensure continuous and safe operation of nuclear power plants. Referring to FIG. 1, a shaft seal type main pump is provided with a water lubricated radial bearing 10 and a shaft seal assembly 11 on the pump body. The water lubricated radial bearing 10 mainly bears the radial force of the main pump; and the shaft seal assembly 11 ensures that the reactor coolant is prevented from leaking along the pump shaft 12 to the reactor plant under normal operating conditions and design basis accident conditions in a controllable leakage manner, and the shaft seal assembly 11 limits the amount of leakage to the limits specified in the accident safety analysis criteria at the SBO (Station Black Out) condition.

In order to ensure the cooling and lubrication of the water lubricated radial bearing 10 and the shaft seal assembly 11 and prevent the high temperature and high pressure coolant from being conducted to the shaft system above the impeller 13, so that the water lubricated radial bearing 10 and the shaft seal assembly 11 can be operated in an acceptable temperature range to ensure normal and stable operation of the main pump, it is necessary to provide a shaft seal water injection system on the pump body, and a redundancy design needs to be considered to improve its reliability. It is known that nuclear power plant shaft seal type main pump usually use a flange assembly without a heat exchanger provided therein. In order to ensure the normal operation of the main pump, the shaft seal water injection system is usually composed of two parts: upper filling water from the RCV system (Chemical and Volume Control System) and high temperature water from the main pump. The main pump is provided with an external heat exchanger which is supplied with equipment cooling water by the RRI system (Component Cooling Water System).

Referring to FIGS. 2 and 3, a related nuclear plant main pump shaft seal water injection system includes an jet pump 20, a hydrocyclone 21, a high pressure cooler 22 and a connection pipeline 23 provided outside the main pump, and two auxiliary pumps 24, 25 and an internal flow path provided inside the main pump. The inner and outer flow paths of the main pump are connected through a shaft seal water injection hole and a high temperature water drainage hole in the main flange 14. The working media of the jet pump 20 is a low temperature upper filling water from the RCV system and the ejection media is a high temperature reactor coolant at the back of the impeller 13 in the main pump, both of which are mixed in the jet pump 20, and then flows through the shaft seal water injection hole of the main flange 14 into the shaft seal chamber 15 after cooled by the high pressure cooler 22 and filtered by the hydrocyclone 21. One part of the injected water provides cooling and lubrication for the shaft seal assembly 11, and the other part of the injected water flows along the pump shaft 12 under the action of the auxiliary pump 24 to cool and lubricate the water lubricated radial bearing 10. The pressure is increased by the action of the other auxiliary pump 25 and then divided into two parts, one part of which enters the RCP system (Reactor Coolant system) and the other part enters the external circulation as the ejection media of the jet pump 20. The high pressure cooler 22 is provided with cooling water by the RRI system. The shaft seal water injection system works as follows: 1) the upper filling water of the RCV system is mixed with the high temperature reactor coolant as a shaft seal injection water normally; 2) when the injection water of the RCV system is lost and the main pump is running, a certain amount of water is circulated in the system under the action of the two auxiliary pumps 24, 25 to provide lubrication and cooling for the shaft seal assembly 11 and the water lubricated radial bearing 10; 3) when the main pump is out of service and the low temperature upper filling water of the RCV is lost, a natural circulation can be established under the action of the high pressure cooler 22 and a certain flow rate of the shaft seal injection water is continued; 4) when RRI equipment cooling water is lost and RCV low temperature upper filling water is normal, the temperature of the shaft seal injection water is within the allowable operating temperature range of the shaft seal assembly 11 and the water lubricated radial bearing 10.

However, the shaft seal water injection system shown in FIGS. 2 and 3 has at least the following drawbacks: first, the effective exhaust cannot be achieved and the normal operation of the system cannot be ensured; second, two auxiliary pumps 24, 25 are required in the main pump, which will increase the complexity of the internal structure of the main pump; third, the reactor coolant cannot be effectively isolated when the jet pump 20, the hydrocyclone 21 and the high pressure cooler 22 need to be serviced; fourth, the system status cannot be monitored because there is no corresponding monitoring instruments on the system loop; fifth, when the high pressure cooler 22 fails, the main pump must be stopped.

Referring to FIGS. 4 and 5, another related main pump shaft seal water injection system of a nuclear plant includes a jet pump 30, a high pressure cooler 31, a hydrocyclone 32, a number of valves, a connection pipeline 33, and a pressure sensor 34 provided outside the main pump, and an auxiliary pump 35 and an internal flow path provided inside the main pump. The inner and outer flow paths of the main pump are connected through a shaft seal water injection hole and a high temperature water drainage hole in the main flange 14a. The working media of the jet pump 30 is a low temperature upper filling water from the RCV system and the ejection media is a high temperature reactor coolant from the main pump housing 16, both of which are mixed in the jet pump 30 and then flows through the shaft seal water injection hole of the main flange 14a into the shaft seal chamber 15 after cooled by the high pressure cooler 31 and filtered by the hydrocyclone 32. One part of the injected water provides cooling and lubrication for the shaft seal assembly 11, and the other part of the injected water flows along the pump shaft 12 under the action of the auxiliary pump 35 to cool and lubricate the water lubricated radial bearing 10 and finally into the back of the main pump impeller 13 and confluences with the reactor coolant in the pump housing 16. The valve 36 on the main connection pipeline is in the normally open state, the valves 37 and 38 on the exhaust pipeline are in the normally closed state, and the valves 37 and 38 are used only for exhausting and are closed after completion of the exhaust. The shaft seal water injection system works as follows: 1) the valve 39 and the valve 40 are closed normally, and the low temperature water from the RCV system is injected directly into the shaft seal chamber 15 through the jet pump 30, the high pressure cooler 31 and the hydrocyclone 32 and acts as a main pump shaft seal injection water; the high pressure cooler 31 is in the stand-by state and the loss of the RRI apparatus cooling water does not affect the normal operation of the main pump; 2) when the low temperature injection water of the RCV system is lost and the main pump is running, the valve 40 is opened, the high temperature reactor coolant from the main pump housing 16 is cooled by the high pressure cooler 31 and flows through the hydrocyclone 32 into the shaft seal chamber 15, so as to provides lubrication and cooling for the shaft seal assembly 11 and the water lubricated radial bearing 10; when the main pump is shut down, a natural circulation can be established under the action of the high pressure cooler 31 to continue supplying the shaft seal injection water for the main pump; 3) when the main pump is out of service and the valve 39 is opened, the low temperature water from the RCV system and the high temperature reactor coolant from the pump housing 16 are mixed in the jet pump 30 and then passed through the high pressure cooler 31 and the hydrocyclone 32 into the shaft seal chamber 15; when the main pump is shut down, a natural circulation can be established under the action of the high pressure cooler 31 to continue supplying the shaft seal injection water for the main pump.

However, the shaft seal water injection system as shown in FIGS. 4 and 5 at least has the following disadvantages: first, the control of the seal water injection system in running is complex, valves 39, 40 need to be operated usually; second, when the main pump is out of service, if the upper filling water of RCV is lost at the same time, a natural circulation cannot be established, which may lead to failure of providing shaft seal injection water; third, when the high pressure cooler 31 and the jet pump 30 is out of service, the main pump must be stopped; fourth, the valve 36 is located on the connection pipeline 33 before the shaft seal water injection hole of the main flange 14a, if the valve 36 malfunctions, normal operation of the shaft seal water injection system will be affected.

In view of the foregoing, what is needed, therefore, is to provide a main pump shaft seal water injection system of nuclear power plant which can solve the above problems.

BRIEF SUMMARY OF VARIOUS EMBODIMENTS OF THE INVENTION

One object of the present invention is to provide a main pump shaft seal water injection system of a nuclear power plant which is reliable in operation, easy to operate and convenient to maintain, so as to ensure that it can complete the function of supplying shaft seal injection water for the main pump under various working conditions and reliable operation of the main pump.

According to one embodiment of the present invention, a main pump shaft seal water injection system of a nuclear power plant includes a jet pump, a high pressure cooler, a hydrocyclone, valves and a main connection pipeline each arranged outside the main pump, and an auxiliary pump and an internal flow path arranged in the main pump, inner and outer flow paths of the main pump are connected with the shaft seal water injection hole and the high temperature water drainage hole on the main connection pipeline; the main connection pipeline is connected between the upper filling water pipeline of the RCV and the shaft seal water injection hole of the main flange, the jet pump, the high pressure cooler and the hydrocyclone are sequentially arranged on the main connection pipeline. The main pump shaft seal water injection system of a nuclear power plant further includes a bypass pipeline connected in parallel with the jet pump, the high pressure cooler and the hydrocyclone, the main connection pipeline is provided with a normally open main pipeline isolating valve at each end of the parallel section connected in parallel with the bypass pipeline; the bypass pipeline allows the low temperature upper filling water of the RCV system to bypass the jet pump, the high pressure cooler and the hydrocyclone, and enter the shaft seal water injection hole of the main flange directly.

According to one aspect of the present invention, one end of the bypass pipeline is connected to the main connection pipeline from the upstream of the jet pump, the other end of the bypass pipeline is connected to the main connection pipeline from the downstream of the hydrocyclone; and the bypass pipeline is provided with a normally closed bypass isolation valve.

According to one aspect of the present invention, the upstream main pipeline isolation valve is located between the jet pump and the upstream access point of the bypass pipeline, and the downstream main pipeline isolation valve is located between the hydrocyclone and the downstream access point of the bypass pipeline.

According to one aspect of the present invention, the main pump shaft seal water injection system of a nuclear power plant further includes an ejection media pipeline connected between the high temperature water drainage hole of the main flange and the ejection media inlet of the jet pump, the working media inlet and the pump outlet of the jet pump are connected with the main connection pipeline.

According to one aspect of the present invention, the working media of the jet pump is a low temperature upper filling water from the RCV system and the ejection media is the high temperature reactor coolant from the main pump housing, both of which are mixed in the jet pump, and then flow through the shaft seal water injection hole of the main flange into the shaft seal chamber after cooled by the high pressure cooler and filtered by the hydrocyclone, one part of the injected water provides cooling and lubrication for the shaft seal assembly, and the other part of the injected water flows along the pump shaft under the action of the auxiliary pump to cool and lubricate the water lubricated radial bearing and finally enters the back of the main pump impeller to confluence with the reactor coolant in the pump housing.

According to one aspect of the present invention, the ejection media pipeline is provided with a normally opened ejection media isolation valve, when the main pipeline isolation valve and the ejection isolation valve are closed, the jet pump, the high pressure cooler and the hydrocyclone on the parallel section of the main pipeline will be isolated from the reactor coolant.

According to one aspect of the present invention, the main pump shaft seal water injection system of a nuclear power plant further includes an exhaust pipeline connected to the bypass pipeline, the exhaust pipeline is equipped with two normally closed exhaust isolation valves.

According to one aspect of the present invention, the pump shaft is only provided with one auxiliary pump located between the shaft seal assembly of the main pump and the water lubricated radial bearing.

According to one aspect of the present invention, the main connection pipeline is provided with a pressure sensor, the pressure sensor is located downstream of the two access points of the main connection pipeline connecting the bypass pipeline, so as to monitor the running status of the system in real time through the pressure measurement.

According to one aspect of the present invention, the RRI system provides the high pressure cooler with cooling water.

Compared with the prior art, the main pump shaft seal water injection system of a nuclear power plant according to the present invention can ensure the safety and reliability of the system operation and the maintainability of the system through the redundant design and optimization of the system structure and control.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention:

DETAILED DESCRIPTION OF THE INVENTION

Figure 1:
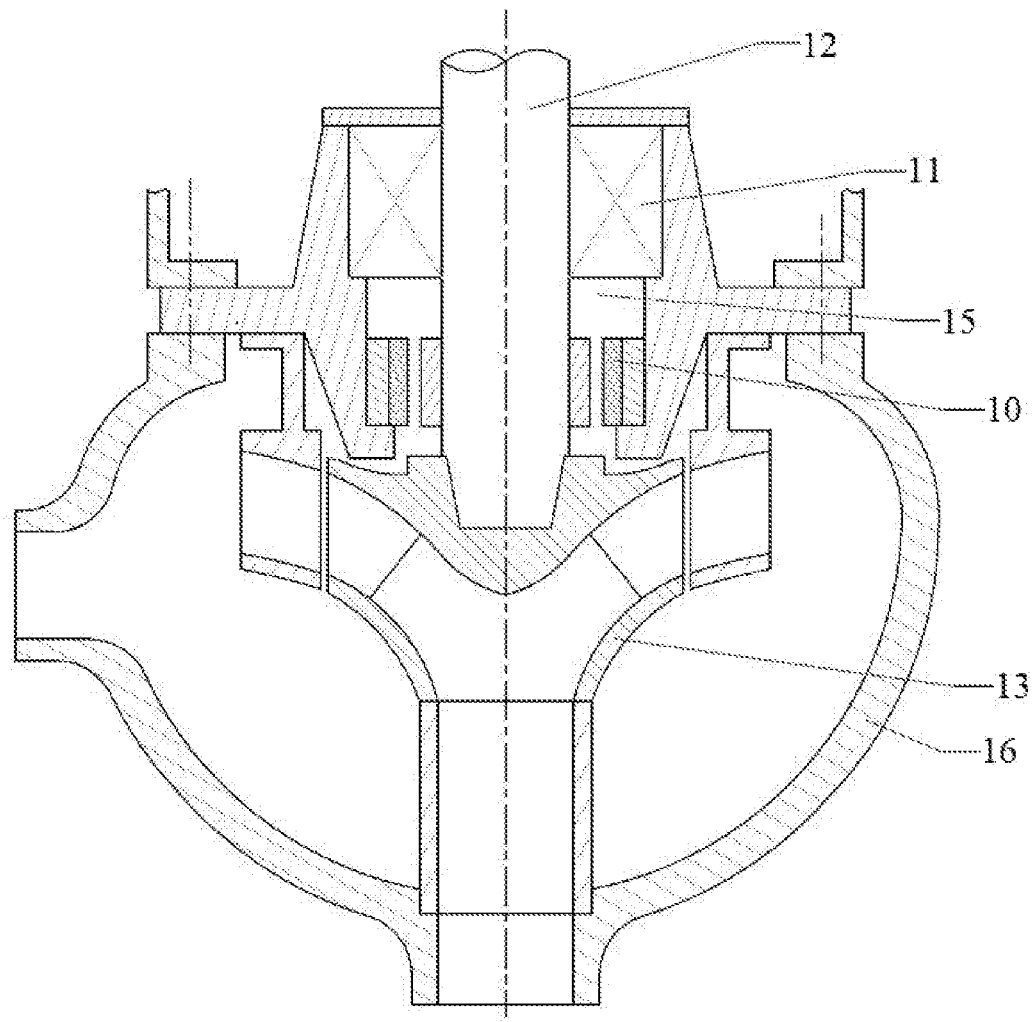
FIG. 1 depicts an internal structure schematic diagram of a nuclear power plant shaft seal type main pump.
Figure 2:
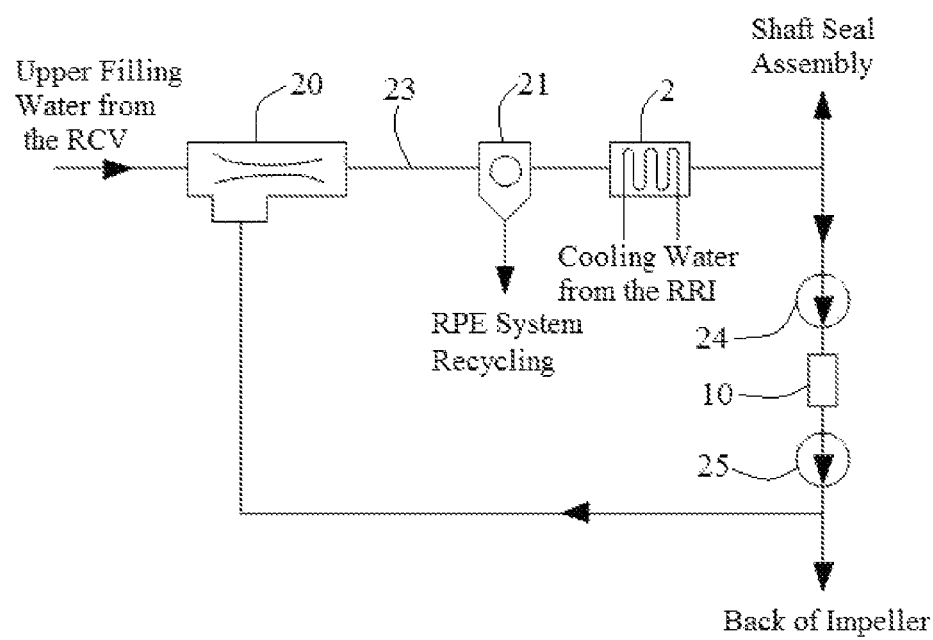
FIG. 2 depicts a schematic diagram of a related injection pump system of a main pump shaft seal of a nuclear power plant.
Figure 3:
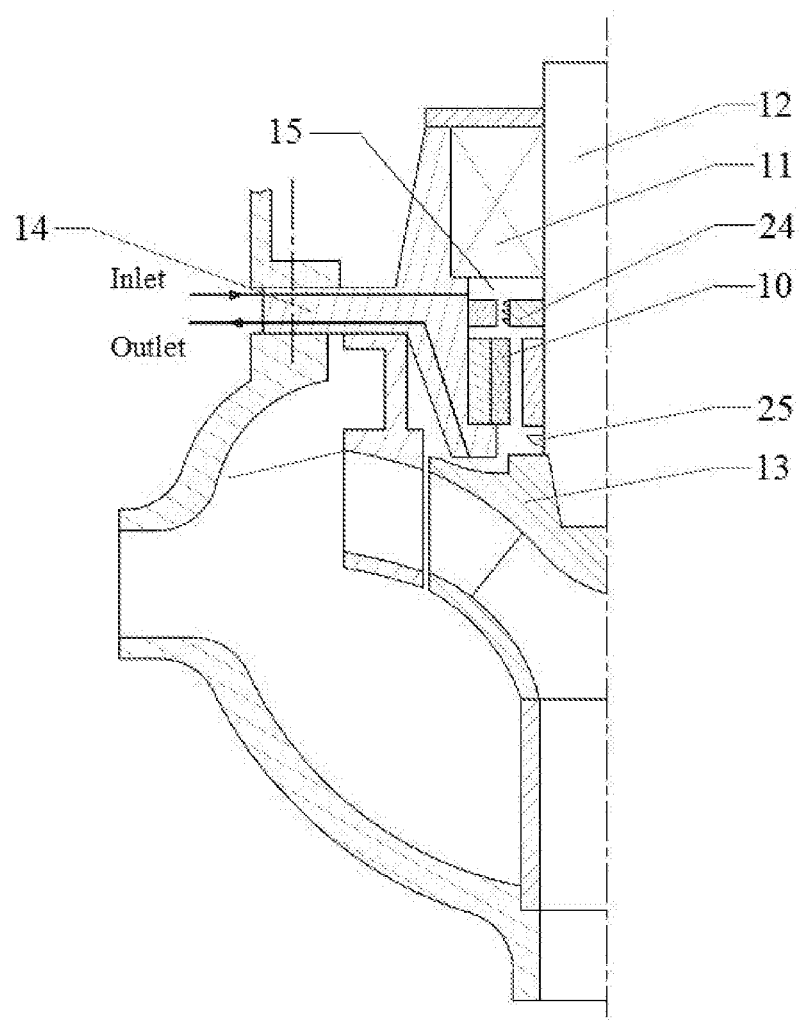
FIG. 3 depicts an internal structure schematic diagram of the main pump of a main pump shaft seal water injection system of FIG. 2.
Figure 4:
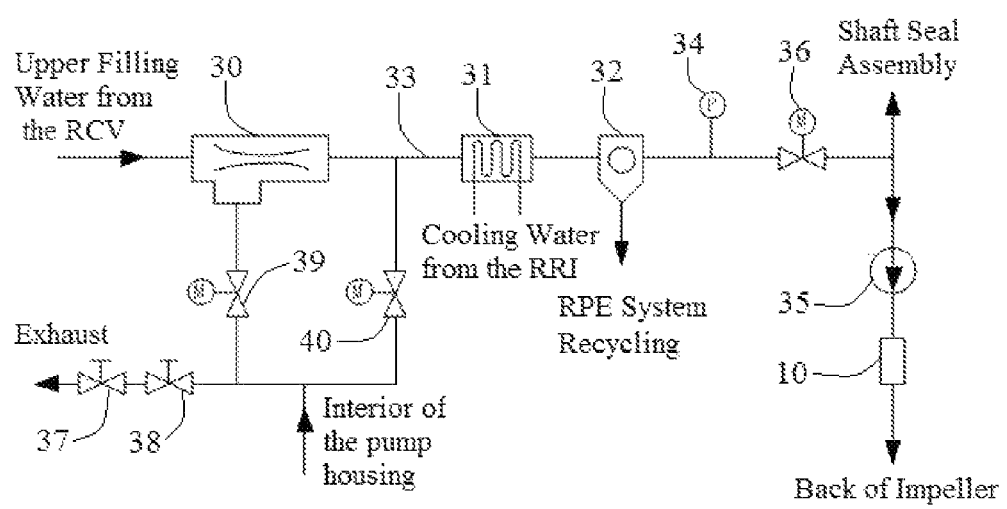
FIG. 4 depicts a schematic diagram of another related main pump shaft seal water injection system of a nuclear power plant.
Figure 5:
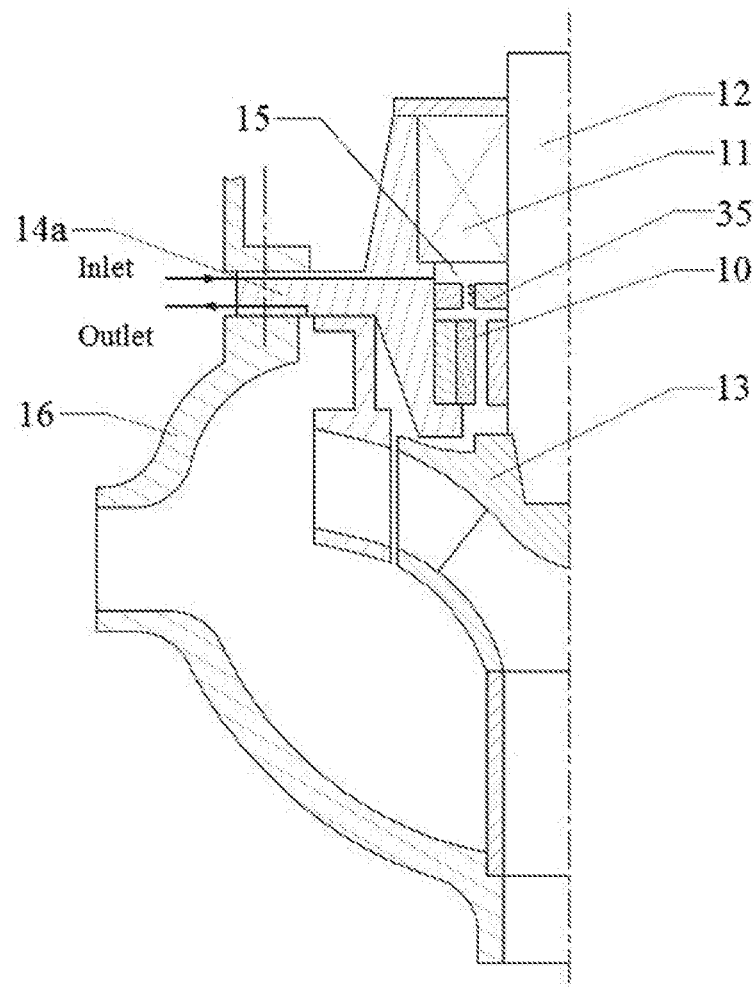
FIG. 5 depicts an internal structure schematic diagram of the main pump of a main pump shaft seal water injection system of FIG. 4.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 6:
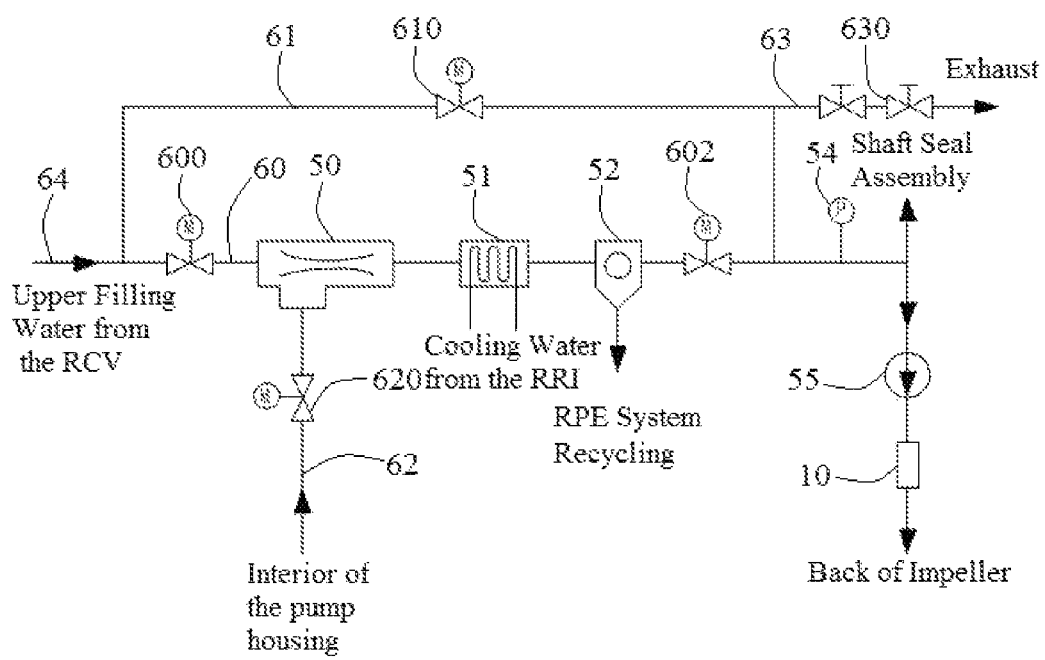
FIG. 6 depicts a schematic diagram of a main pump shaft seal water injection system of a nuclear power plant according to one embodiment of the present invention.
Figure 7:
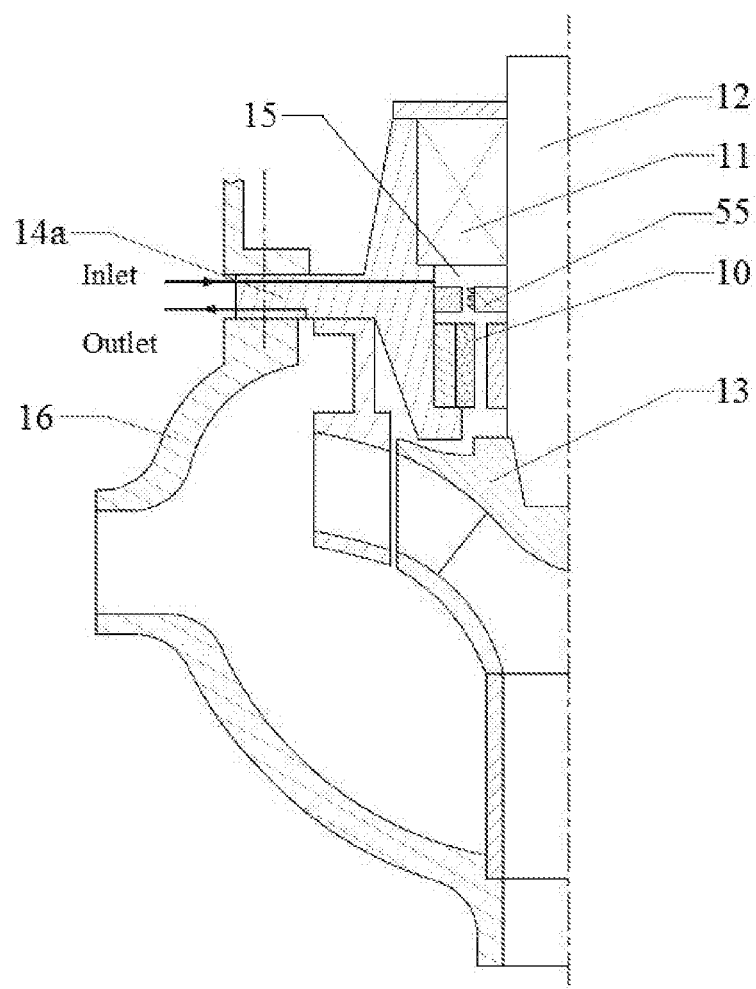
FIG. 7 depicts an internal structure schematic diagram of the main pump of the main pump shaft seal water injection system of FIG. 6.

Referring to FIGS. 6 and 7, the main pump shaft seal water injection system of a nuclear power plant according to the present invention includes a jet pump 50, a high pressure cooler 51, a hydrocyclone 52, a plurality of valves, connection pipelines and a pressure sensor 54 located outside the main pump, and an auxiliary pump 55 and an internal flow path provided inside the main pump. The inner and outer flow paths of the main pump are connected through a shaft seal water injection hole and a high temperature water drainage hole in the main flange 14a. The high pressure cooler 51 is provided with cooling water by the RRI system. The auxiliary pump 55 is provided on the pump shaft 12, and is located between the water lubricated radial bearing 10 and the shaft seal assembly 11.

The connection pipeline outside the main pump includes a main connection pipeline 60, a bypass pipeline 61, an ejection media pipeline 62 and an exhaust pipeline 63.

The main connection pipeline 60 is connected between the upper filling water pipeline 64 of the RCV and the shaft seal water injection hole of the main flange 14a. The jet pump 50, the high pressure cooler 51, the hydrocyclone 52 and the pressure sensor 54 are sequentially arranged on the main connection pipeline 60, in which the working media inlet and the pump outlet of the jet pump 50 are all connected to the main connection pipeline 60. The ejection media pipeline 62 is connected between the high temperature water drainage hole of the main flange 14a and the ejection media inlet of the jet pump 50. A normally open ejection media isolation valve 620 is provided before the ejection media inlet of the jet pump 50. Therefore, the working media of the jet pump 50 is the low temperature upper filling water from the RCV system and the ejection media is the high temperature reactor coolant from the main pump housing 16, both of which are mixed in the jet pump 50 and then flow into the shaft seal chamber 15 through the shaft seal water injection hole of the main flange 14a after cooled by the high pressure cooler 51 and filtered by the hydrocyclone 52. One part of the injected water provides cooling and lubrication for the shaft seal assembly 11, and the other part of the injected water flows along the pump shaft 12 under the action of the auxiliary pump 55, so as to cool and lubricate the water lubricated radial bearing 10 and finally flow to the back of the main pump impeller 13 and confluence with the reactor coolant in the pump housing 16.

One end of the bypass pipeline 61 is connected to the main connection pipeline 60 from the upstream of the jet pump 50, and the other end of the bypass pipeline 61 is connected to the main connection pipeline 60 from the downstream of the hydrocyclone 52, thereby forming a branch pipe connected in parallel with the jet pump 50, the high pressure cooler 51 and the hydrocyclone 52, so that the low temperature upper filling water of the RCV system can bypass the jet pump 50, the high pressure cooler 51, and the hydrocyclone 52, and enter the shaft seal water injection hole of the main flange 14a directly through the distal end of the main connection pipeline 60. The bypass pipeline 61 is provided with a normally closed bypass isolation valve 610, and the main connection pipeline 60 is provided with normally open main pipeline isolation valves 600, 602 at both ends of the parallel section parallel to the bypass pipeline 61. The main pipeline isolation valve 600 located upstream is provided between the jet pump 50 and the upstream access point of the bypass pipeline 61. The main pipeline isolation valve 602 located downstream is provided between the hydrocyclone 52 and the downstream access point of the bypass pipeline 61. Therefore, when the main pipeline isolation valves 600, 602 and the ejection isolation valve 620 are closed, the jet pump 50, high pressure cooler 51 and hydrocyclone 52 which are on the parallel section of the main pipeline can be isolated and maintained.

One end of the exhaust pipeline 63 is connected to the bypass pipeline 61, and the other end is configured to exhaust. The exhaust pipeline 63 is provided with two exhaust isolation valves 630. The two exhaust isolation valves 630 are configured for exhausting only, which are closed after completion of exhaust.

The working principle of the main pump shaft seal water injection system of a nuclear power plant according to the present invention is detailed as following:

1) Under normal conditions, the main pipeline isolation valves 600, 602 and the ejection media isolation valve 620 are opened, the bypass isolation valve 610 is closed, the low temperature upper filling water from the RCV system provides working media to inject the high temperature reactor coolant from the main pump housing 16, both of which are mixed in the jet pump 50, and then enters the shaft seal chamber 15 through the shaft seal water injection hole of the main flange 14a after cooled by the high pressure cooler 51 and filtered by the hydrocyclone 52. After entering the shaft seal chamber 15, one part of the injected water flows upwardly and provides cooling and lubrication for the shaft seal assembly 11, and the other part flows downwardly and is pressurized by the auxiliary pump 55, so as to cool and lubricate the water lubricated radial bearing 10, and finally flows to the back of the main pump impeller 13 and confluence with the reactor coolant in the pump housing 16.

2) When the upper filling water of the RCV system is lost, and the main pipeline isolation valve 600 upstream of the jet pump 50 is closed, the high temperature reactor coolant from inside of the pump housing 16 passes through the jet pump 50 and enters the high pressure cooler 51 to be cooled and then is injected into the shaft seal chamber 15 through the hydrocyclone 52 and the main flange 14a. Under the dynamic pressure effect of the shaft seal and the action of the auxiliary pump 55, the injection water is divided into two parts, with one part of which cooling and lubricating the shaft seal assembly 11 and flowing to the RCV system and the RPE system (Nuclear Island Vent and Drain System) and other part of which entering the back of the main pump impeller 13 to merge with a loop reactor coolant in the pump housing 16 after cooling and lubricating the water lubricated radial bearing 10 When the main pump is shut down, the natural circulation can be established under the action of the high pressure cooler 51 to continue supplying the shaft seal injection water for the main pump;

3) When the RRI equipment cooling water fails, the main pipeline isolation valves 600, 602 and the ejection media pipeline 620 are closed, the bypass isolation valve 610 is opened, and the low temperature upper filling water of the RCV system provides the main pump with the shaft seal injection water directly.

In view of the foregoing description, the main pump shaft seal water injection system of a nuclear power plant according to the present invention at least has the following advantages over the prior art:

First, a bypass pipeline 61 in parallel with the jet pump 50, the high pressure cooler 51 and the hydrocyclone 52 is provided, and when the jet pump 50, the high pressure cooler 51 and the hydrocyclone 52 are malfunctioning, the main pump isolation valves 600, 602 and the ejection media isolation valve 620 can be closed and the bypass isolation valve 610 can be opened, so as to provide the main pump with the shaft seal injection water by the bypass pipeline 61 and ensure the normal operation of the main pump;

Second, when the upper filling water of the RCV system is lost and the main pump is in the rotating state, the shaft seal injection water is supplied by forced circulation under the dynamic pressure effect of the shaft seal and the action of the auxiliary pump 55;

Third, when the upper filling water of the RCV system is lost and the main pump is out of service, the shaft seal injection water is supplied by natural circulation under the action of the high pressure cooler 51;

Fourth, when the RRI equipment cooling water fails, the low temperature upper filling water of the RCV system can provides the main pump with the shaft seal injection water directly through the bypass pipeline 61;

Fifth, the main pipeline isolation valve 600 is operated only when the RCV is lost, which reduces the number of valve operations effectively and improves the reliability of the system;

Sixth, the reactor coolant can be effectively isolated by shutting off the main pipeline isolation valves 600, 602 and the injection medium isolation valve 620, thereby servicing the jet pump 50, the high pressure cooler 51 and the hydrocyclone 52;

Seventh, the shaft seal water injection system is equipped with an exhaust pipeline 63, which can be sufficiently exhausted before the running of the system and ensure stable operation of the system;

Eighth, the main connection pipeline 60 is provided with a pressure sensor 54 which is capable of monitoring the operating state of the system in real time by pressure measurement.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions describe example embodiments, it should be appreciated that alternative embodiments without departing from the scope of the appended claims. Although specific terms are employed herein, they are used in a generic and descriptive sense only and not for purposes of limitation.

What is claimed is:

1. A main pump shaft seal water injection system of a nuclear power plant, comprising: a jet pump, a high pressure cooler, a hydrocyclone, valves and a main connection pipeline arranged outside of a main pump, an auxiliary pump and an internal flow path arranged in the main pump, inner and outer flow paths of the main pump are connected with a shaft seal water injection hole and a high temperature water drainage hole on the main connection pipeline, the main connection pipeline is connected between an upper filling water pipeline of a RCV and a shaft seal water injection hole of a main flange, the jet pump, the high pressure cooler and the hydrocyclone are sequentially arranged on the main connection pipeline, further comprising a bypass pipeline connected in parallel with the jet pump, the high pressure cooler and the hydrocyclone, the main connection pipeline is provided with a normally open main pipeline isolating valve at each end of a parallel section connected in parallel with the bypass pipeline, the bypass pipeline allows low temperature upper filling water in the RCV system to bypass the jet pump, the high pressure cooler and the hydrocyclone, and enter the shaft seal water injection hole of the main flange directly.

2. The main pump shaft seal water injection system of claim 1, wherein one end of the bypass pipeline is connected to the main connection pipeline from upstream of the jet pump and the other end of the bypass pipeline is connected to the main connection pipeline from downstream of the hydrocyclone, and the bypass pipeline is provided with a normally closed bypass isolation valve.

3. The main pump shaft seal water injection system of claim 2, wherein an upstream main pipeline isolation valve is located between the jet pump and an upstream access point of the bypass pipeline, and a downstream main pipeline isolation valve is located between the hydrocyclone and a downstream access point of the bypass pipeline.

4. The main pump shaft seal water injection system of claim 3, further comprising an ejection media pipeline connected between a high temperature water drainage hole of the main flange and an ejection media inlet of the jet pump, and a working media inlet and a pump outlet of the jet pump are connected with the main connection pipeline.

5. The main pump shaft seal water injection system of claim 4, wherein a working media of the jet pump is low temperature upper filling water from the RCV system, and the ejection media is high temperature reactor coolant from a main pump housing, both of which are mixed in the jet pump and then flow through the shaft seal water injection hole of the main flange into a shaft seal chamber after cooled by the high pressure cooler and filtered by the hydrocyclone, one part of injected water provides cooling and lubrication for a shaft seal assembly, and the other part of injected water flows along a pump shaft under action of the auxiliary pump to cool and lubricate a water lubricated radial bearing, and finally enter back of a main pump impeller and confluence with the reactor coolant in a pump housing.

6. The main pump shaft seal water injection system of claim 4, wherein the ejection media pipeline is provided with a normally opened ejection media isolation valve, when the main pipeline isolation valve and the ejection media isolation valve are closed, the jet pump, the high pressure cooler and the hydrocyclone which are on parallel section of the main pipeline will be isolated from the reactor coolant.

7. The main pump shaft seal water injection system of claim 1, further comprising an exhaust pipeline connected to the bypass pipeline, and the exhaust pipeline is equipped with two normally closed exhaust isolation valves.

8. The main pump shaft seal water injection system of claim 1, wherein the auxiliary pump is formed on a pump shaft and arranged between a shaft seal assembly of the main pump and the water lubricated radial bearing.

9. The main pump shaft seal water injection system of claim 1, wherein the main connection pipeline is provided with a pressure sensor, the pressure sensor is located downstream of two access points of the main connection pipeline connecting the bypass pipeline, and the pressure sensor can monitor running status of the system in real time via pressure measurement.

10. The main pump shaft seal water injection system of claim 1, wherein a RRI system provides the high pressure cooler with cooling water.

* * * * *